Aug. 18, 1964
H. C. SIMONICH
3,145,102
METHOD OF AND APPARATUS FOR MAKING
SINTERED POWDERED METAL PARTS
Filed Feb. 24, 1961
2 Sheets-Sheet 1
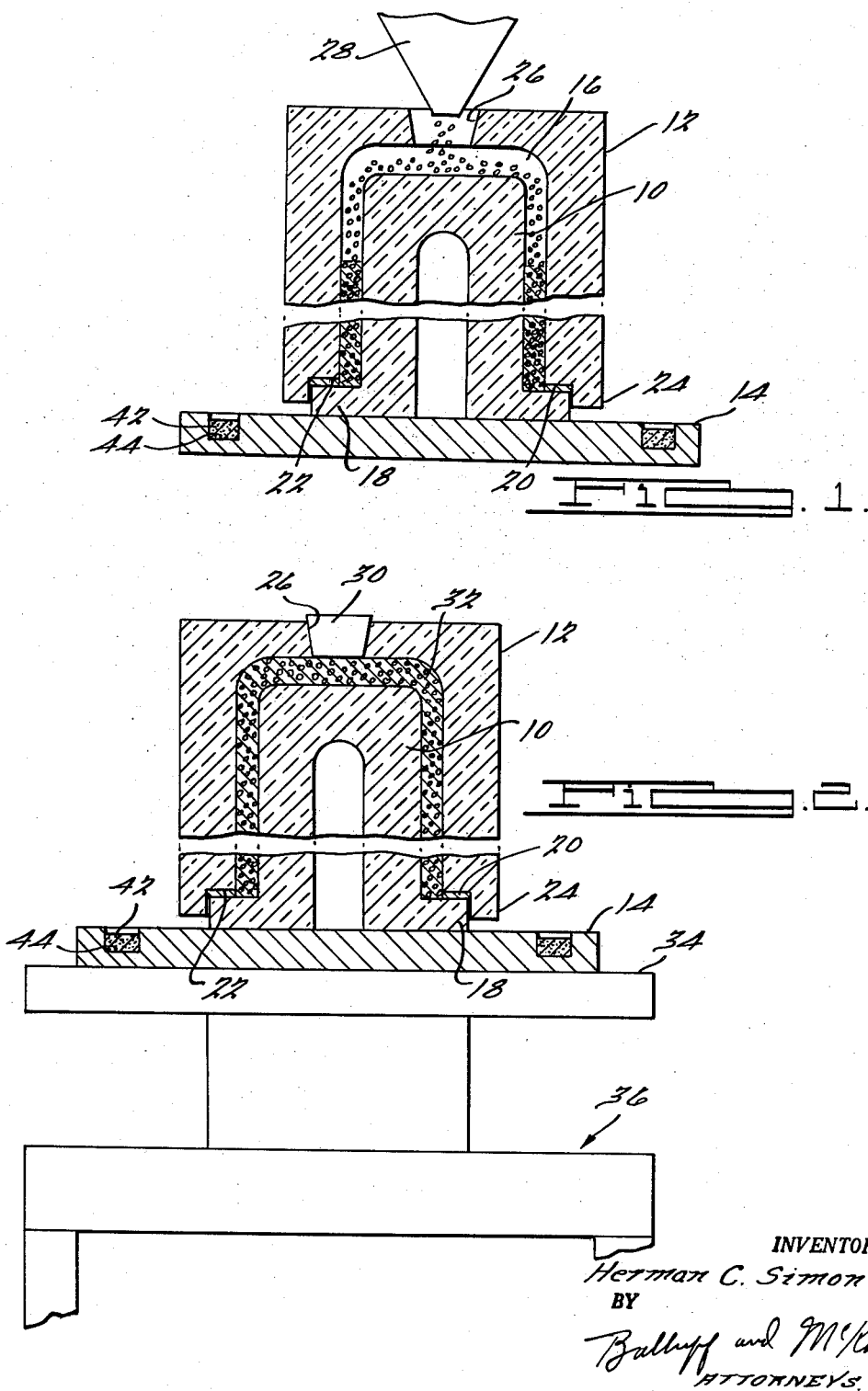
INVENTOR.
Herman C. Simonich.
BY
Balluff and McKinley
ATTORNEYS.

Aug. 18, 1964
H. C. SIMONICH
3,145,102
METHOD OF AND APPARATUS FOR MAKING
SINTERED POWDERED METAL PARTS
Filed Feb. 24, 1961
2 Sheets-Sheet 2
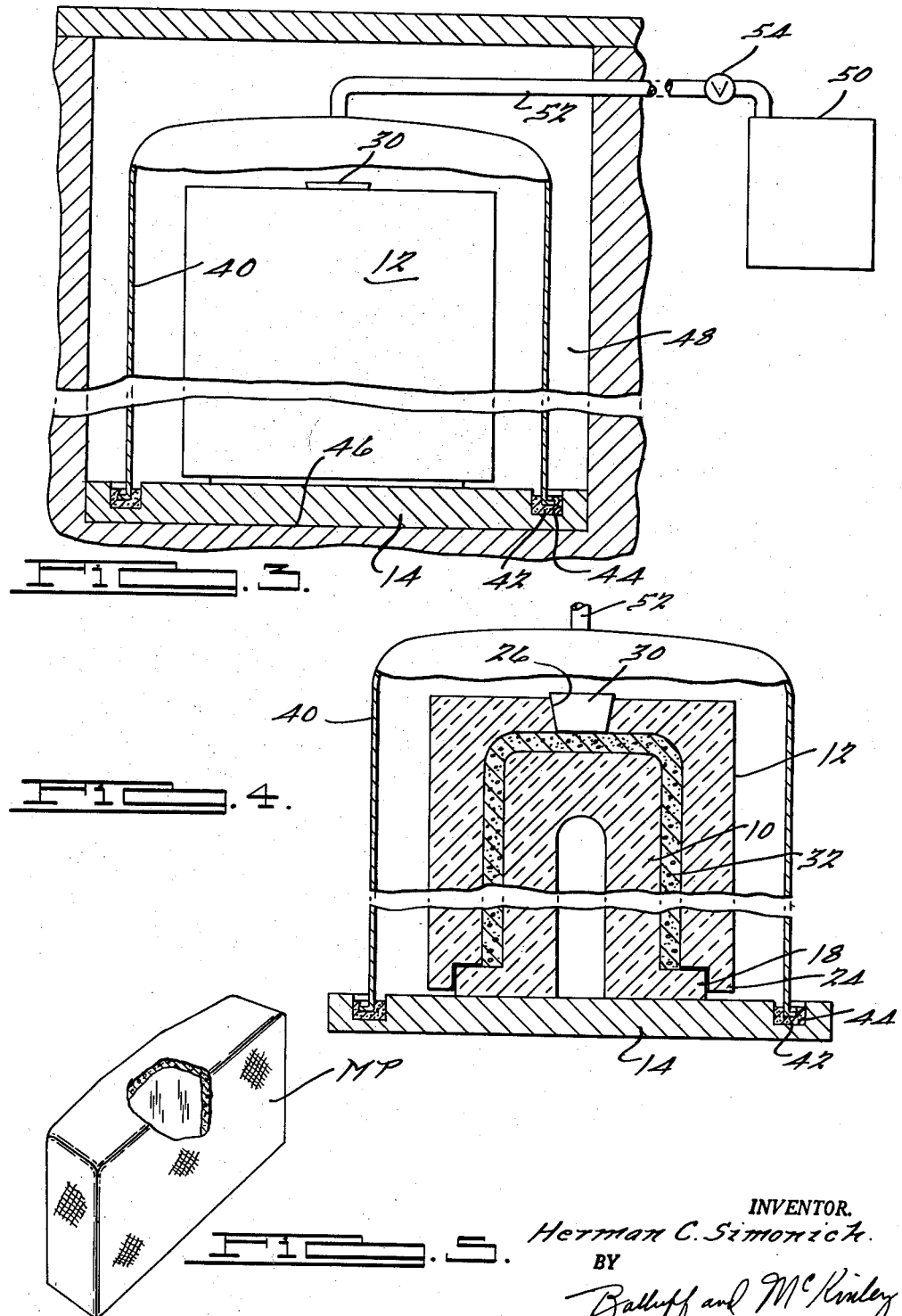
INVENTOR.
Herman C. Simonich.
BY
Balluff and McKinley
ATTORNEYS

United States Patent Office 3,145,102
Patented Aug. 18, 1964

3,145,102
METHOD OF AND APPARATUS FOR MAKING SINTERED POWDERED METAL PARTS
Herman C. Simonich, 130 Barrington Place, Dearborn, Mich.
Filed Feb. 24, 1961, Ser. No. 91,458
9 Claims. (Cl. 75—214)

This invention relates to the art of making sintered powdered metal parts and has particular reference to new and useful techniques which make it possible to accurately and economically produce relatively large, sintered, powdered metal, finished parts, such for example as dies and molds, without the necessity of resizing, coining, or machining the sintered part.

According to conventional practices in the art of making sintered powdered metal parts, it is not possible to make such parts of a size larger than about 6 inches in diameter, 8 inches in height, and 12 pounds in weight. In addition, sintered parts made according to conventional practice require sizing or coining in accurate dies to obtain precision finished dimensions, higher densities, and smoother surface finishes.

The techniques herein disclosed make it possible to accurately produce relatively large finished sintered parts efficiently and economically and have been employed to produce relatively large dies and molds: in one instance, a vacuum forming permeable bronze die of a size 54 in. x 19.5 in. x 2 in. and weighing about 300 lbs.; in another instance, a permeable bronze water tank mold 22 in. x 19 in. x 9 in. and weighing about 215 lbs.; and in still another instance, a permeable 304 stainless steel mold for a 7.60 in. x 14 in. tire, weighing about 68 lbs.

A principal object of the invention, therefore, is to provide a new and improved method of and apparatus for making sintered powdered metal parts which are particularly useful for the accurate production of relatively large finished parts, such as dies and molds.

Other and further objects of the invention will be apparent from the following description and claims and may be understood by reference to the accompanying drawings, of which there are two sheets, which by way of illustration show a preferred embodiment of the invention and what I now consider to be the best mode of applying and practicing the principles thereof. Other embodiments of the invention may be used without departing from the scope of the present invention as set forth in the appended claims.

In the drawings:

FIG. 1 is a sectional view of a mold assembly useful in practicing the invention and illustrating the step of charging the mold cavity with powdered metal, the mold and the pallet for supporting the mold being shown in section with the mold cavity partially filled with powdered metal;

FIG. 2 is a view, partly in section, illustrating the step in which the mass of powdered metal in the mold cavity is compacted;

FIG. 3 is a view showing the mold in a furnace wherein the sintering is carried out;

FIG. 4 is a view illustrating the step of chilling the sintered mass in a neutral atmosphere; and FIG. 5 is a fragmentary view of a hollow porous sintered metal mold which is the product of the process and apparatus herein disclosed.

As illustrated in FIG. 1, porous or permeable ceramic molds 10 and 12 are arranged on a pallet 14 in such a way that the molds define a mold cavity 16 for making a hollow part. The molds 10 and 12 and the cavity 16 are rectangular in horizontal cross section. The pallet 14 provides a supporting surface for the mold assembly and consists of a flat grate-like metal structure having openings therethrough. As shown, the inner or male mold 10 is hollow and is provided with a continuous, outwardly projecting flange 18 whereby the mold 10 is supported upright on the pallet 14. The upper or outer mold 12 envelopes the inner mold 10, the opposing surfaces of the molds 10 and 12 being accurately spaced and disposed so as to define a mold cavity 16 which closely conforms to the finished shape of the sintered part to be made, with allowance for a predetermined shrinkage of the metal powder, preferably less than 1%, due to sintering. The product of the process may, for example, be a permeable bronze mold useful in pressure molding ceramic ware or pottery from clay.

A spacer or continuous strip 20 of fusible material such as wax is preferably disposed upon the upper surface of the flange 18 around the periphery thereof and this spacer 20 provides a seat upon which the inner peripheral surface 22 of the outer mold 12 rests, whereby the outer mold 12 is supported on the inner mold 10 and the mold cavity is closed at the bottom thereof. Other material, such as sand with a fusible binder, may be used instead of the wax. As shown, the outer mold includes a continuous locating flange or skirt 24 which fits over the flange 18. The outer mold 12 is provided with a filler opening 26 whereby cavity 16 can be loosely filled with powdered metal from a suitable hopper through a filling spout 28. After the molds 10 and 12 are arranged as shown on a suitable supporting surface, such as the pallet 14 as shown in FIG. 1, and the cavity is charged with a loose fill of powdered metal, a plug 30 is positioned in the opening 26 so as to close the same. The plug 30 has a loose fit in the opening 26 and not only closes the opening 26 but is of some mass so as to apply pressure to the mass 32 of powdered metal in the mold cavity 16.

Thereafter the pallet 14 is positioned on the table surface 34 of a vibrating machine indicated generally at 36 whereby the mass 32 is compacted while it is subjected to pressure by the plug 30. The vibrating machine 36, schematically illustrated, may be of a commercial type which is adjustable so as to vibrate at a selected frequency over a wide range of frequencies. Such vibration is to insure that the mold cavity is completely filled and that the mass of powdered metal therein is of uniform density. It is preferable to use powdered metal where the particles are of uniform size. However, most commercial available metal powders vary considerably in the size of the particles, and if the mass of powdered metal in the mold is vibrated excessively, the coarse particles tend to rise and the fine to settle, which is undesirable. In any event, the powdered metal should be thoroughly premixed and blended so that the mass thereof is substantially uniform before the mold is charged. In making relatively large parts of the sizes heretofore indicated, the mold has been vibrated at a selected frequency of from 6000 to 8000 vibrations per minute, but the rate of vibration and the period thereof are widely variable, depending upon the shape and size of the mold and other known factors bearing on the specifications of the desired product, the object being to vibrate the mold and the mass of powdered metal therein so as to compact the powdered metal to a uniform density and completely fill the mold cavity while maintaining a substantially uniform consistency throughout the mass. For mold cavities of relatively simple shape and form it is possible to compact the powdered metal by tamping the mold with a hammer.

The briquetting operation conventionally used in powder metallurgy compresses the powdered metal under substantial pressure into briquettes having a "green strength," whereas the compacting step I employ packs but does not compress the powdered metal, so that the compacted mass 32 has little or no "green strength" and has a substantially lower density than the conventional briquette. Accordingly, the molds 10 and 12 do not require the strength built into conventional briquetting dies.

I carry out the sintering step with the compacted mass 32 completely enclosed and confined in the molds 10 and 12. Thus after the mass of powdered metal is compacted in the mold cavity 16, the pallet 14 and the molds thereon are disposed in a furnace as schematically illustrated in FIG. 3 with a metal bell or retort 40 enclosing the molds 10 and 12. The plug 30 is considered to a be a part of the outer mold 12. The wall thickness of the molds 10 and 12 preferably should be such that the mass 32 is uniformly heated throughout during the sintering step by the conduction of heat through the walls of the molds 10 and 12, and where the inner mold 10 will not be heated as efficiently as the outer mold 12, it is desirable to make the walls of the outer mold 12 thicker than the walls of the inner mold 10 for the purpose of heating the mass of powdered metal uniformly on both sides.

The bell 40 is of steel and has its lower end embedded in the sand 42 in the continuous groove 44 provided in the upper surface of the pallet 14. The pallet 14 seats on the flat surface 46 of the furnace chamber 48 so that the bell 40 cooperates with the pallet 14 and the bottom wall 46 of the furnace chamber to define a protective enclosure around the molds 10 and 12.

The furnace schematically shown in FIG. 3 may be any conventional heat treating furnace heated in any conventional way to uniformly heat the furnace chamber 48 and the walls thereof to a sufficient temperature to carry out the sintering of the mass 32. Thus the furnace chamber and the walls thereof are heated to a sufficient temperature whereby the bell 40 and the pallet 14 are heated. The bell 40 in turn radiates heat to the outer mold 12 for heating the same, while the pallet 14 and the bottom wall 46 of the furnace chamber serve to heat the mold 10 and to some extent the mold 12. The heating temperatures required for sintering powdered metal in accordance with conventional practices are well known in the literature of the art and run from about 900° to 1600° F. for bronze and bronze alloys up to about 1900° to 2250° F. for stainless powders. By fully utilizing the method herein disclosed, I have found that it is possible to effect high quality sintering at temperatures somewhat lower than according to conventional practice.

Thus by slowly increasing the temperature of the powdered metal mass uniformly throughout during sintering I have found that the maximum temperature required for sintering can be materially less than conventional, with appreciably less shrinkage. Preferably the temperature of the mass 32 is controlled so as to limit the shrinkage to 1% or less. As heating of the mass 32 through the sintering temperature range progresses, some temperature gradient in the mass is unavoidable. However, I control the heating through the upper portion of the sintering range so as to keep the temperature gradient as low as possible and desirably within a range of about 25° F.

The temperature throughout the mass being sintered is equalized just below the sintering temperature range and the temperature thereafter increased in increments so that all of the mass being sintered will be processed at substantially the same temperature level for substantially the same time period. As the powdered metal will overshrink if it gets too hot, it is desirable to sinter at no higher maximum temperature than required for commercially acceptable sintering.

The mold 10 is preferably hollow whereby the exterior surfaces of the inner mold 10 opposite the mold surfaces thereof which define the mold cavity 16 are heated by radiant heat as well as by conduction, and thus the inner mold 10, like the outer mold 12, conducts heat through the walls thereof to the mass 32 for heating both sides of the mass 32 simultaneously and substantially uniformly.

The pallet 14 with the molds and the bell 40 thereon preferably is charged into the furnace when the furnace is at or below 900° F., and the controls (which are conventional) that regulate the heating of the furnace are controlled in such a way that the furnace heat is gradually increased so as to slowly and gradually increase the temperature of the mass 32, say for example, in steps of from 50° to 100° F. A series of thermocouples are disposed directly in contact with the powdered mass 32 at a plurality of places, and such thermocouples are connected to suitable (conventional) temperature recording instruments whereby the temperature of the different parts of the mass 32 can be observed in order that the heating means of the furnace can be regulated so as to achieve gradual and uniform heating throughout the mass 32, particularly during the temperature range throughout which sintering is carried out. The thermocouples should be located on those parts of the mass 32 which are heated most readily, as well as on those parts which are most difficult to heat, so that the maximum and minimum temperatures prevailing throughout the mass can be readily determined at any time and the heating thereof correspondingly controlled.

After the heating has been initiated, the mass 32 is preferably heated to an elevated temperature just below the temperature at which sintering of the powdered metal begins, and the molds and mass 32 are allowed to soak at such temperature so as to allow the temperature throughout the mass 32 to equalize. By observing the indicated temperature readings of the recording instruments connected to the thermocouples, the furnace temperature can be controlled so as to bring all of the mass 32 to a temperature below that at which sintering begins, and thereafter the temperature of the mass is gradually increased, say, for example, in steps of about 50° to 100° F., until the maximum sintering temperature is achieved. It should be understood that the maximum sintering temperature depends upon the particular blend of powdered metal being employed. During sintering, the heating of the furnace is controlled so as to gradually increase the temperature uniformly throughout the entire mass of the material being sintered, and this can readily be done by regulating the heat of the furnace in the light of the temperatures shown by the recording instruments connected to the thermocouples embedded in the powdered metal.

Before heating of the molds and the powdered metal mass therein, the interior of the bell 40 and the molds are purged by a suitable purge gas, such as nitrogen, so as to eliminate oxygen therefrom. Thereafter a neutral sintering atmosphere or one with a slight reducing potential, such as hydrogen, is piped from a source 50 through pipe 52 under the control of valve 54, the pipe 52 being arranged to discharge the sintering atmosphere inside of the bell 40. Such atmosphere is supplied to the interior of bell 40 at a suitable pressure so as to force gas therein to flow through the sand seal under the lower edge of the bell 40 and through the openings in the pallet 14. The hydrogen as it escapes around the outer periphery of the retort 40 is burned. The sintering atmosphere should be free of moisture vapor, and in lieu of hydrogen any other conventional neutral sintering gas may be used which will permit heating of the powdered metal without degrading thereof or oxidation or other unwanted reactions. As the molds 10 and 12 are porous, atmosphere entrained therein or trapped in the powdered mass 32, or generated by pore forming material blended in the powdered metal, is efficiently liberated and vented as the heating proceeds and carried away by the sintering atmosphere which is continuously supplied during the entire heating and cooling steps in the sintering process until the sintered product is chilled to a temperature at which it is substantially stable in air.

As heretofore indicated, the molds 10 and 12 with the mass 32 in the cavity thereof are heated in the furnace at a temperature and for a time period sufficient to uniformly sinter the mass, and thereafter the sintered mass is chilled in the neutral atmosphere. During heating the fusible ring 20 melts, and this causes the weight of outer mold 12 to bear directly on the mass 32 before the sintering temperature is reached. In this way the mass of powdered metal in the mold cavity 16 is subjected to the yielding pressure of the molds 10 and 12 and also confined as well as enclosed thereby during the heating as well as during the cooling of the mass 32. Either or both of the surfaces of the molds 10 and 12 which define the mold cavity may have a suitable draft so as to facilitate separation of the molds from the sintered part. As the molds 10 and 12 are relatively disposed so as to apply pressure to the mass 32 during sintering and chilling, the draft of the mold cavity surfaces may be selectively utilized to increase the pressure on the inner or outer faces of the mass during sintering and chilling. The confining pressure on the mass 32 by the molds 10 and 12 during the heating and cooling serves to control the expansion and the shrinkage of the mass 32 and obtain a sintered part substantially free of warping and distortion and other defects. It is believed that the porosity of the molds, particularly of the inner mold 10, permits it to yield somewhat upon the shrinkage of the powdered metal part during the cooling step and thus serves to avoid fracturing of the sintered part during the cooling step.

The chilling of the sintered part is carried out by gradually cooling the molds in a neutral atmosphere with the sintered part confined in the mold cavity in such a way as to permit the sintered part to cool uniformly and gradually throughout the mass thereof. Such slow cooling serves to anneal the sintered part and relieve stresses therein. My process produces a sintered product which is more ductile and flexible than the conventional sintered product.

The mass of powdered metal being yieldably confined by the mold during the heating and cooling thereof is entirely heated and cooled by the conduction of heat through the mold walls, which during heating shield the mass from radiant heat. This contributes toward the uniform heating and cooling of the mass 32.

The molds 10 and 12 are precision cast, permeable ceramic molds made of a suitable refractory and fire cured at a temperature of about 2000° F. before use in my process. The molds, for example, may be made generally in accordance with the method of making refractory molds as disclosed in U.S. Patent No. 2,795,022, dated June 11, 1957, and No. 2,811,760, dated November 5, 1957, or in accordance with any method which will produce precision permeable ceramic molds suitable for use in my process. Preferably a small amount of pore forming material, such as lithium stearate, is uniformly blended in the refractory mix for making the molds 10 and 12. Up to about 2% to 3% of this material preferably is used. The firing of the molds 10 and 12 during their manufacture burns off this material and makes such molds uniformly porous throughout substantially dimensionally stable and inert with respect to the powdered metal during the sintering and chilling operations. Any other equivalent material or technique may be used for achieving porosity in the molds. The porosity of the molds permits the free escape from the mold cavity of gas trapped therein or generated therein during the heating cycle, and this contributes substantially to the obtaining of a sintered part of substantially homogeneous character throughout, free of voids. The cost of making such cast ceramic molds is only a small fraction of the cost that would be involved in making metal dies of comparable form and size, and so far as I know, there is no way of making metal molds suitable for use in sintering with a porosity as in ceramic molds. Furthermore, the high thermal conductivity of metal molds precludes their use in making large sintered parts.

I have found a blend of powdered tabular alumina powders as produced by "Alcoa" suitable as the basic refractory mix for making the molds 10 and 12 with which a suitable type binder and a pore forming material, such as lithium stearate, are blended. This produces excellent porous ceramic molds for stainless steel and other metal powders. However, for less critical applications than stainless steel, less expensive basic refractories may be used, such for example as a zircon flour and sand mix, or a silica sand and flour mix. The lithium stearate added to the refractory mix, as well as the binder, burns out during the firming of the ceramic mold and serves to make the mold substantially more porous than would otherwise be the case. In lieu of the lithium stearate, other materials, such as sawdust or corn meal, may be employed, although I have found the lithium stearate to give excellent results since it burns off without leaving any residues. Any suitable accelerator or hardener may be added to the refractory mix to expedite the setting thereof. For best results I have found that the pores of the ceramic mold should be of a micron size and, as above indicated, the pore size can be controlled to some extent by the amount of lithium stearate or equivalent material used.

The ceramic molds 10 and 12 are precision made of a size to compensate for a predetermined shrinkage of the metal powders, and as hereinbefore noted, it is desirable to keep this shrinkage to a factor of less than 1%. The ceramic molds are made so that they are not brittle or easily fractured, and to withstand without damage the normal handling that such ceramic molds would get in repeated use. The heating of the ceramic molds in sintering in accordance with my process seems to improve the molds, although after being fire cured they do have the ability to withstand thermal shock without damage. The coefficient of thermal expansion of such ceramic molds is low as compared with that of metal molds, which contributes to the great utility of such ceramic molds in my process, particularly in the making of large parts.

The process and apparatus herein disclosed may be used for making finished sintered parts of any commercially available powdered metal, such as bronze, stainless steel, tungsten, tungsten carbide, aluminum, beryllium, copper, nickel, and alloys of the foregoing.

The mold cavity surfaces may have thereon a suitable texture or pattern MP, such as a leather texture, so that the outer surface of the hollow sintered part formed in the molds 10, 12 will have such texture molded therein. Thus the molds 10, 12 may be formed with a molded texture simulating that of leather, stone, and many other designs and patterns by creating such texture or pattern on the patterns used in making the molds. This, of course, molds such pattern in the ceramic molds 10 and 12, which in turn mold such pattern in the sintered part made in the molds 10 and 12 in accordance with my process, and hence such a part may be used for making other parts with desired texture or pattern molded therein. This is of considerable significance in vacuum forming of plastics and in molding rubber, and may be applied to ceramic ware made by sintered molds made in accordance with my process.

The sintered parts made in accordance with my process may have any desired density within conventional limits. The density normally obtained from a given metal powder or blend as used in accordance with my process can be increased by using a percentage of such powder of finer particle size and/or by using a percentage of lower melting point alloy in the blend as a filler or bonding agent, and conversely the density can be decreased by using a powder of coarser particle size or by using a smaller amount of the lower melting point alloy. The process herein disclosed has been used to make sintered molds of a selected density between 30% and 90%, and with pores of a selected size or range of sizes as low as about 4 microns and as big as about .040 inch, uniformly disposed. It is possible with this process to achieve uniform selected densities and uniform selected pore sizes in the sintered mass. The uniformity of the density and pore size throughout the mass is closely related with the accuracy in making large parts because the uniformity of density and pore size has an important bearing on the uniformity of heating and cooling of the sintered parts. I have used my process in making sintered parts of a predetermined thickness within the range from .060 to 3 inches.

The thermal conductivity of the porous ceramic molds is substantially and materially less than that of metal molds, and I have found that substantially uniform heating and cooling of the mass of powdered metal or the sintered metal may be obtained only with ceramic molds when making large parts. The thermal conductivity of the ceramic molds I use is no greater than that of the compacted powdered metal and less than that of the sintered metal part formed therefrom. It is possible that metal molds or graphite molds may be useful in making small parts in accordance with my process as hereinabove set forth, but based upon my experience the porous ceramic molds hereinbefore referred to are necessary in the making of large parts, due to the fact that with porous ceramic molds it is possible to effectively control the heating and cooling of the powdered metal during the sintering and cooling operations so as to avoid warping, distortion, fracturing, and overshrinkage if the heating and cooling steps are carried out so as to gradually heat and cool the mass 32 through the sintering temperature range. The process as herein disclosed makes it possible to accurately produce finished parts of large sizes without subsequent sizing or machining operations. In some processes for which the sintered metal molds produced in accordance with the process herein disclosed are used, any subsequent resizing or machining operations on the sintered molds would seriously impair their quality and utility.

The process and apparatus as hereinbefore disclosed are also useful in making integrated or composite parts, such as dies and molds with layers of different porosity—that is, with a layer of a selected porosity on one face and a layer of a different selected porosity on the other face. Such a composite part may be produced by carrying out the process as heretofore set forth through the stage where the molded powder mass is only partially sintered or presintered; that is, where it is sintered only enough to integrate or bind the mass together into a definite form so as to permit removal of the outer mold 12 from the mold assembly as shown in FIG. 4, for example, leaving the partially sintered mass assembled with the inner mold 10. The outer mold 12 is then replaced with a similar mold but of a larger size so as to create a new mold cavity between the partially sintered mass on the mold 10 and the enlarged mold 12. Thereafter the new cavity is loose-filled and the method as originally described is carried out to completion. In the final sintering operation the partially sintered mass is integrated with the mass of additional powdered metal so as to form an integrated composite part in which the porosity on one face is of one characteristic and the porosity on the other face is of another characteristic. This not only makes it possible to have different pore sizes and densities on one face of a mold as compared with the other face, but also makes it possible to use somewhat different metal powders on one side than on the other where the sintering of both masses can be carried out throughout substantially the same temperature range without impairing either face of the part.

While I find it preferable for several important reasons to compact the mass of powdered metal in the mold cavity so as to obtain uniform density of the mass in the mold cavity, without compressing such mass as in conventional practice, where the shape of the mold cavity and the strength of the mold permit, the mass may be compressed providing that a mass of uniform density is obtained. The concentrating of the powdered metal in the mold cavity may be expedited or achieved in whole or in part by the application of suction to the exterior of the porous refractory molds.

The sintered product of my process is especially useful as a permeable mold in pressure molding ceramic ware, in molding rubber, in blow molding rubber and plastic, in molding styrofoam beads, in vacuum forming plastic parts, and large sintered products where uniform porosity is desired.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. That method of making a sintered powdered metal part which comprises: positioning permeable ceramic molds so as to define a mold cavity, charging said cavity with a substantially homogeneous mass of powdered metal, compacting said mass of powdered metal in said cavity without substantial separation of particles thereof of different sizes, purging air from said molds and said compacted mass of powdered metal through the pores of said permeable molds, heating said molds with the compacted mass of powdered metal in the cavity thereof in a controlled non-oxidizing sintering atmosphere to an elevated temperature so as to bring said molds and such mass to a substantially uniform temperature at or just below the lower end of the sintering temperature range for said powdered metal, gradually and uniformly heating said molds and such mass through the lower portion of said sintering temperature range for a time period sufficient to sinter said mass and so that all of such mass will be uniformly sintered at substantially the same temperature level at substantially the same time during said period, venting gas from the mold cavity through the pores of said permeable molds as the heating proceeds, slowly cooling said hot sintered mass and molds in a neutral atmosphere, said method being characterized in that said molds are movable relative to each other and exert a yielding pressure on said mass in said mold cavity so that the adjacent surfaces of said molds and such mass remain in intimate contact with each other during the heating and cooling thereof, and that said molds heat and cool the mass solely by the conduction of heat through said molds which shield said mass from radiant heating and cooling.

2. That method of making a sintered powdered metal part which comprises: positioning permeable ceramic molds so as to define a mold cavity, charging said mold cavity with a substantially homogeneous mass of powdered metal, compacting said mass of powdered metal in said cavity, uniformly heating said mass through the sintering temperature range for said powdered metal for a time period sufficient to sinter said mass and so that all of such mass will be sintered at substantially the same temperature level for substantially the same period, venting gas from the mold cavity through the pores of said permeable molds as the heating proceeds, and chilling said sintered mass in a neutral atmosphere, said method being characterized in that said molds yieldably confine the surface of the mass during the heating and cooling of such mass through the sintering temperature range.

3. That method of making a sintered powdered metal part which comprises: positioning permeable molds so as to define a mold cavity, charging said mold cavity with a substantially homogeneous mass of powdered metal, compacting said mass of powdered metal in said cavity, heating said molds with the compacted mass of powdered metal in the cavity thereof in a non-oxidizing sintering atmosphere to an elevated temperature so as to bring such mass to a substantially uniform temperature at or just below the lower end of the sintering temperature range for said powdered metal, slowly and uniformly heating said mass through said sintering temperature range for a time period sufficient to uniformly sinter said mass and so that all of such mass will be sintered at substantially the same temperature level for substantially the same period, venting gas from the mold cavity through the pores of said permeable molds as the heating proceeds, and slowly cooling said sintered mass and molds in a neutral atmosphere, said method being characterized in that said molds are movable relative to each other and exert a yielding pressure on said mass in said mold cavity so that the adjacent surfaces of said molds and such mass are maintained in intimate contact with each other during the heating and cooling of such mass through the sintering temperature range.

4. That method of making a hollow sintered powdered metal part which comprises: utilizing confining walls of refractory material so as to define a hollow mold cavity of predetermined form, charging said mold cavity full with a substantially homogeneous mass of powdered metal, compacting said mass of powdered metal in said cavity into a hollow form as defined by said cavity, slowly and uniformly heating said mass through the sintering temperature range for said powdered metal for a time period sufficient to sinter said mass and so that all of such mass will be uniformly sintered at substantially the same temperature level for substantially the same period, and chilling said sintered mass in a neutral atmosphere, said method being characterized in that said walls confine the inside and outside surfaces of said hollow mass during the heating and cooling of such mass through the sintering temperature range so that the cooled sintered mass accurately reflects the contours of said mold cavity.

5. That method of making a sintered powdered metal part which comprises: positioning permeable walls so as to define a mold cavity, charging said mold cavity with a mass of powdered metal, slowly and uniformly heating said mass in a non-oxidizing sintering atmosphere through the sintering temperature range for said powdered metal for a time period sufficient to sinter said mass and so that all of such mass will be uniformly sintered at substantially the same temperature level for substantially the same period without subjecting said mass to thermal stress sufficient to warp such mass, and cooling said sintered mass in a neutral atmosphere, said method being characterized in that said walls are movable relative to each other and exert a yieldable pressure on said mass in said mold cavity so that the adjacent surfaces of said walls and such mass are maintained in intimate contact with each other during the heating and cooling of such mass through the sintering temperature range while freely venting gas from the mold cavity through the pores of such walls.

6. That method of making a sintered powdered metal part which comprises: positioning porous walls so as to define a mold cavity of predetermined form, charging said mold cavity with a substantially homogeneous mass of powdered metal, compacting said mass of powdered metal in said cavity, heating said walls with said compacted mass of powdered metal in the cavity thereof in a sintering atmosphere to an elevated temperature sufficient to integrate such mass at a temperature within the lower end of the sintering temperature range for said powdered metal, substituting porous walls of a different size for certain of said porous walls so as to form a second mold cavity between said integrated mass and said substituted walls, charging said second mold cavity with a substantially homogeneous mass of powdered metal of different character than said original mass, compacting said second mass of powdered metal in said second mold cavity, uniformly heating said first and second masses in a sintering atmosphere through the sintering temperature range for a time period sufficient to unite and sinter both of said masses into a composite unit and so that all of said composite unit wil be sintered at substantially the same temperature level for substantially the same period, and chilling said sintered unit in a neutral atmosphere, said method being characterized in that said walls yieldably confine the surfaces of said masses during such heating and cooling through the sintering temperature range while gas is vented from the mold cavity through the pores of said walls as the heating proceeds.

7. That method of making a sintered powdered metal part which comprises: forming a mold cavity, charging said cavity with a substantially homogeneous mass of powdered metal, concentrating said powdered metal in said cavity into a mass of uniform density, uniformly heating said mass through the sintering temperature range in a non-oxidizing sintering atmosphere for a time period sufficient to sinter said mass and so that all of such mass will be uniformly sintered at substantially the same temperature level for substantially the same period, and chilling said sintered mass in a neutral atmosphere, said method being characterized in that the walls forming said mold cavity apply a yieldable pressure upon said mass to assure that such mass accurately conforms to the shape of said mold cavity, said pressure being applied during the heating and cooling of such mass through the sintering temperature range, and in that the material forming said mold cavity is permeable so as to freely liberate gas from the mold cavity through said permeable material as the heating proceeds.

8. That continuous method of making a sintered powdered metal part which comprises: forming a mold cavity, charging said cavity with a mass of powdered metal, disposing said mass of powdered metal in said cavity so that the density throughout said mass is uniform, heating the walls forming the mold cavity with the mass of powdered metal in the cavity thereof in a non-oxidizing sintering atmosphere to a temperature below the sintering temperature range of said powdered metal, slowly and uniformly heating said mass through said sintering temperature range in a sintering atmosphere and for a time period sufficient to sinter said mass uniformly, and slowly cooling said sintered mass in a neutral atmosphere, said method being characterized in that said walls confine the surfaces of said mass during the heating and cooling thereof through the sintering temperature range, and in that said mass is heated so that all of it will be sintered at substantially the same temperature level for substantially the same period.

9. Apparatus for sintering hollow powdered metal parts comprising permeable ceramic molds arranged to define a mold cavity for holding and confining and enclosing a mass of powdered metal to form such hollow part while permitting the free venting of gas from the mold cavity through the pores of the ceramic material of which the molds are made, means for supporting said molds so that the molds exert a yielding pressure on the inner and outer surfaces of said hollow mass of powdered metal in the mold cavity during the sintering and chilling of said mass, said molds being disposed so that during heating heat is transmitted to the mass of powdered metal in the mold cavity through the molds directly to all surfaces of said mass.

References Cited in the file of this patent
UNITED STATES PATENTS

| | | |
|---|---|---|
| 2,077,345 | Van Der Pyl | Apr. 13, 1937 |
| 2,175,899 | Kelly | Oct. 10, 1939 |
| 2,304,723 | Wolff et al. | Dec. 8, 1942 |
| 2,384,215 | Toulmin | Sept. 4, 1945 |
| 2,425,053 | Swinehart | Aug. 5, 1947 |
| 2,437,127 | Richardson | Mar. 2, 1948 |
| 2,464,517 | Kurtz | Mar. 15, 1949 |
| 2,721,138 | Baker et al. | Oct. 18, 1955 |
| 2,886,433 | Blainey | May 12, 1959 |
| 2,994,606 | Goodzeit | Aug. 1, 1961 |

FOREIGN PATENTS

| | | |
|---|---|---|
| 718,382 | Great Britain | Nov. 10, 1954 |
| 739,260 | Great Britain | Oct. 26, 1955 |